3,064,135
METHOD AND APPARATUS FOR INSPECTING
MULTIPLE SHEET GLAZING UNITS
Robert P. Roetter, Perrysburg, and Norman O. Falk, Toledo, Ohio, assignors to Libbey-Owens-Ford Glass Company, Toledo, Ohio, a corporation of Ohio
Filed Sept. 14, 1959, Ser. No. 839,634
6 Claims. (Cl. 250—218)

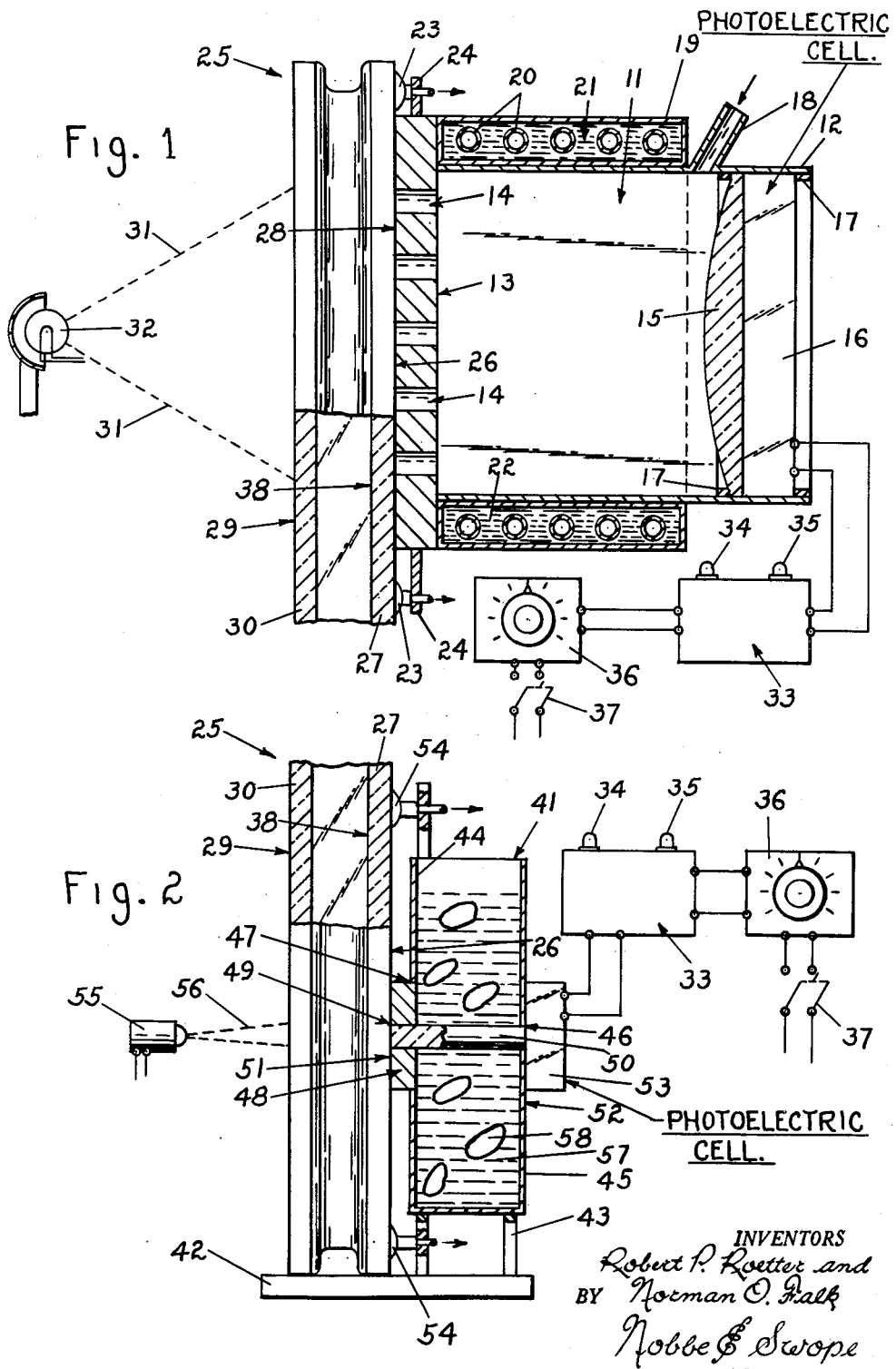

The present invention relates to a method and apparatus for inspecting multiple sheet glazing units comprised of two or more sheets or plates of glass joined continuously around their marginal edges, in spaced face-to-face relation, to provide a hermetically sealed unitary structure. More particularly, this invention concerns a novel method and apparatus for rapidly determining whether the air or gas confined within the closed space between the spaced sheets of a multiple sheet glazing unit is anhydrous within commercial tolerances.

Hermetically sealed glazing units have become established in the building industry for the purpose of improved heat insulation as well as for reducing condensation upon the glass sheets of the unit. As is well known in the art, in order to provide such a unit with the desired heat insulating and condensation preventing qualities, it is necessary that moisture laden air be removed from the space or spaces between the sheets of glass making up the unit. This may be done by partial evacuation or by replacing the moist air with dry air or gas, whichever is best suited for the ultimate use to which the unit is to be put.

In order to prevent excess leakage of air, moisture or other foreign substance into the air space after dehydration, as well as to retain any particular dry gas confined therein, the spaced sheets are permanently joined at their marginal edges prior to the dehydration of the space therebetween, so that said space is hermetically sealed.

Further, to make possible the removal of moisture from the enclosed space between the sheets, with or without substituting dry gas therefor, after the sheets have been joined at their marginal edges to enclose said space, a means of access to the space must be provided. In addition, after the space has been properly dehydrated, the means of access thereto must be permanently sealed, to complete the hermetic seal of the unit.

The conventional way of providing access to the enclosed space between the glass sheets of glazing units of this general character is to drill or otherwise provide an opening through a portion of the unit, such as for example, the separator means which spaces the sheets from one another and which is made of a material which may be readily and effectively sealed. In all-glass multiple glazing units, wherein the edges of the glass sheets are fused to one another, an opening is drilled or otherwise provided in the marginal face of one of the sheets or in one edge. The methods for forming these openings and the sealing thereof are well known to those skilled in the art.

Prior to the subject invention, quality control inspection of the glazing units for dew point characteristics was performed on a statistical basis. The statistical type of inspection was not a matter of choice, but rather a practical compromise, necessitated by the fact that known methods and apparatus for dew point inspection were too slow and clostly for inspection of every unit. As a result, inspection for condensation lagged appreciably behind production and upon detection of a faulty unit, the units produced subsequent to a previously acceptable unit were suspect. To maintain a high standard of quality it was felt necessary to reinspect all of those units which not only disrupted production and shipping schedules but also increased the cost per unit.

The present invention operates on the principle of reducing the temperature of the glass in a small area so that any moisture suspended in the air within the unit will condense on the interior surface of the glass in this small area and will be detected by a photocell to signal a "reject" on an indicator. Limiting the reduction in temperature to a small area has the advantage of materially accelerating the dew point inspection so that each unit produced may be inspected for condensation within the hermetically sealed air space.

Therefore, it is an object of this invention to provide a novel method for inspecting multiple sheet glazing units for condensation of any moisture which may be suspended in the air within the hermetically sealed space between the sheets.

Another object of this invention is to provide an apparatus for rapidly and effectively determining the hygroscopic characteristics of the air enclosed in the hermetically sealed space between the sheets.

Another object of this invention is to provide apparatus of the above character embodying an interval timer to provide uniformity of successive inspection cycles.

A further object of this invention is to provide, in an apparatus of the above character, light sensitive means for indicating the quality of each glazing unit inspected.

Other objects and advantages of this invention will become apparent during the course of the following description when taken in conjunction with the accompanying drawings.

In the drawings wherein like numerals are employed to designate like parts throughout the same:

FIG. 1 is a vertical sectional view of one form of inspection apparatus provided by the present invention; and FIG. 2 is a vertical sectional view of another form of inspection apparatus.

Referring now to the drawings and particularly to FIG. 1, the apparatus disclosed therein includes a chamber 11 comprised of a relatively short tube 12, which may be round, square or rectangular in cross-section, closed at one end by a plate 13, perforated as at 14 in a regularly spaced two-dimensional pattern, and at its opposite end by a plano-convex lens 15, with the convex surface facing the plate 13 and the plano surface contiguous to the light receiving surface of a photocell 16. A pair of internal bands 17 retain the lens 15 and the photocell 16 in proper position within the tube 12 and also with respect to one another. The tube 12 is provided with an inlet pipe 18 through which a dry air or gas is adapted to be pumped into the interior of the chamber 11 in close proximity to the convex surface of the lens 15. The plate 13 is preferably made of copper or other material having similar thermal conducting characteristics.

The peripheral area of the tube 11 between the plate 13 and the dry air inlet pipe 18 is encompassed by a refrigeration chamber 19 through which a coiled tube 20 is passed. The interior 21 of the refrigeration chamber 19 is preferably filled with alcohol, as indicated by the numeral 22, and a suitable refrigerant is circulated through the coiled tube 20 to reduce and maintain the temperature of the chamber 11 at a specified degree as hereinafter described.

A plurality of vacuum cups 23 are secured to the periphery of the plate 13 in spaced relation, as by brackets 24, and are connected to a central evacuating source (not shown) to hold a multiple glazing unit 25 with the face 26 of one sheet 27 thereof pressed firmly against the exposed face 28 of the plate 13. The exposed face 29 of the second sheet 30 of the glazing unit 25 is in the path of light rays 31 emanating from a source 32 coincident with the center line extending longitudinally through the tube 12.

The electrical system connected to the photocell 16 includes an indicator 33 which is provided with two lights 34 and 35 or other equally suitable signaling devices, one light for indicating an acceptable glazing unit and the other light for indicating a faulty glazing unit; a timer 36 to accurately determine that sufficient time has been allowed for each inspection and a switch 37 for energizing the timer. The switch 37 may also control the application of the vacuum to the cups 23 as by operating a solenoid valve (not shown) in an evacuating line.

For reasons which will become apparent, it is important that any fingermarks, dirt, etc., which may smudge the outer surfaces of the glazing unit must be removed prior to inspection for dew point characteristics of the air entrapped within the space between the glass sheets.

The multiple glazing unit 25 to be inspected is positioned in face-to-face relation with the plate 13, as shown in FIG. 1, and a vacuum applied through the cups 23 to retain the unit in such position for the duration of the inspection. Meanwhile, dry air has been continuously pumped into the chamber 11 through the pipe 18 so that at all times, even between inspection of successive units when some of the air escapes through the holes 14 in the plate 13, the chamber 11 contains only dry air. This is important to prevent condensation forming on the convex surface of the lens 15. Likewise, a refrigerant is continuously circulated through the coiled tube 20 to maintain the temperature within the chamber 11 at approximately $-100°$ F.

Since, as previously specified, the plate 13 is both perforated at 14 and is made of a material having high thermal conduction, the outer surface 28 of the plate 13 is maintained at substantially the same temperature as the interior of the chamber 11. Furthermore, the outer face 28 of the plate 13 is held firmly in contact with a relatively small or localized area of the face 26 of the glazing unit 25 to rapidly reduce the temperature of the glass in the contact area and the air contained within the glazing unit in the area adjacent the contact area. An area of approximately six inches has been found satisfactory. As the temperature is reduced in this area, any moisture suspended in the air within the glazing unit will condense upon the inside face 38 of the sheet 27 to obscure the glazing unit and proportionately reduce the intensity of the light passing therethrough.

As previously described, the photocell 16 and the indicator 33 are electrically connected. Upon inspection of an acceptable glazing unit 25, the intensity of the light rays 31 directed at the photocell 16 is sufficient to energize the light 34 of the indicator 33. However, when a glazing unit 25 is fogged by condensation to reduce the intensity of light directed at the photocell 16 below the minimum standard, the light 35 of the indicator 33 is energized to indicate excessive condensation within the glazing unit 25.

It has been found that setting the timer 36 for an interval of one minute allows sufficient time to reduce the temperature of the air trapped within a unit 25 formed of glass sheets of ⅛″ thickness at the point adjacent the contact of the unit with the plate 13 from ambient room temperature to approximately $-50°$ F. If, at the expiration of this time the light intensity passing through the glazing unit is sufficient to excite the photocell and light the signal lamp 34 of the indicator 33, the glazing unit 25 has passed the dew point inspection and is removed from the apparatus. When checking a unit made of glass sheets of ¼″ thickness a contact time of two minutes is ordinarily necessary.

Since each $20°$ F. reduction in temperature halves the moisture capacity of air, it is evident that the inspection apparatus disclosed herein, when operated within the specified temperature range, is capable of detecting small percentages of water vapor intermixed with air confined within the multiple sheet glazing unit.

The inspection apparatus shown in FIG. 2 operates on the same principles as the apparatus of FIG. 1, namely reducing the temperature of the air entrapped within a multiple sheet glazing unit 25 in a localized area, passing light rays of a selected intensity through the glazing unit at that localized area and to a photocell, which motivates a visual type indicator to respectively signal acceptable and unacceptable glazing units.

However, the inspection apparatus disclosed in FIG. 2 is of a different construction from that of the apparatus shown in FIG. 1 and comprises an open top rectangular tank 41 supported upon a base 42 in any suitable manner such as upon a framework 43.

The upright front and rear walls 44 and 45 respectively of the tank 41 are relatively close together, as shown in the drawings. A small circular opening 46 is formed in the rear wall 45 and a relatively larger circular opening 47 is formed in the front wall 44 in concentric relation to each other and preferably on the intersecting centerlines of the front and rear walls. The opening 47 in the front wall is plugged by an annularly shaped plate 48 having a central opening 49 of the same diameter as the opening 46 in the rear wall and a rod 50 of quartz, or other material having similar light transmitting qualities, extends from the front face 51 of the plate 48 to the rear face 52 of the rear wall 45 and is sealed in the openings 46 and 49. The plate 48 is preferably of copper and approximately two inches in diameter. A photoelectric cell 53 is secured to the rear face of the wall 45 to intercept light rays transmitted through the rod 50.

As in FIG. 1, suction cups 54 are secured to the framework 43 and are connected to an evacuating source to hold the face 26 of the multiple glazing unit 25 firmly in contact with the outer face 51 of the plate 48 during the inspection cycle.

A light source 55 transmits rays of light 56 through the glazing unit 25 in the area aligned with the light transmitting rod 50.

Connected with the photoelectric cell 53 is an indicator 33, timer 36 and switch 37 which may be identical to those of FIG. 1 and which function in the same manner.

Prior to the inspection of the glazing units 25, a quantity of acetone 57 and Dry Ice 58 is placed in the tank 41 to reduce the temperature therein and that of the plate 48. A glazing unit 25 is held firmly against the outer face 51 of the plate 48 by vacuum applied for at least the duration of the test as measured by the timer 36, in the same manner as disclosed in the operation of the apparatus of FIG. 1 and similarly the temperature of the air within the glazing unit and adjacent the plate 48 is reduced to approximately $-50°$ F. to condense any moisture in the entrapped air.

While it is preferred that the temperature of the air within the glazing unit be reduced to $-50°$ F., this temperature may be varied without departing from the spirit of the invention. Thus, it is recognized that a double glazing unit in which the air adjacent the plate 48 has been reduced to a temperature of $-35°$ F. will remain free of condensation under normal conditions of use. However, it is preferred that each unit be tested at a lower temperature, and preferably approximately $-50°$ F., to provide for more severe conditions of service as well as give a margin of safety.

If the air within the glazing unit 25 is dry within prescribed limits, the inner face 38 of the glazing unit 25 will remain sufficiently clear so that the light rays 56 transmitted through the unit and through the rod 50 will excite the photoelectric cell and light the lamp 34 of the indicator 33 to signify an acceptable glazing unit. However, if the moisture in the air within the glazing unit exceeds a permitted amount, condensation upon the inner face 38 of the glazing unit will reduce the intensity of the light rays 56 sufficiently so that the photoelectric cell will not be excited to light the lamp 34, but rather the lamp 35 will signal a faulty or non-acceptable unit.

Although the description of the operation of the apparatus shown in FIGS. 1 and 2 of the drawings has been limited to multiple sheet glazing units comprising two sheets of glass, the apparatus may be advantageously used to inspect multiple sheet glazing units made up of three sheets of glass. The only difference in procedure is that in inspecting a three-sheet glazing the inspection is repeated with the exposed face opposite the face contacted by the plate in the first test held in contact with the plate for a repetition of the test cycle.

It is to be understood that the forms of the invention herewith shown and described are to be taken as illustrative embodiments only of the same, and that various changes in the shape, size and arrangement of parts, as well as various procedural changes may be resorted to without departing from the spirit of the invention or the scope of the subjoined claims.

We claim:

1. In apparatus for inspecting the dew point of multiple sheet glazing units, comprising a plate having a flat surface and at least one opening therethrough, means for reducing the temperature of said plate into the frigid zone, means for holding a part of a major surface of said glazing unit in contact with the flat surface of said plate, means directing rays of light through said glazing unit and said opening, and a photoelectric cell positioned to intercept the rays of light passing through said glazing unit and opening.

2. Apparatus as defined in claim 1, wherein the means for reducing the temperature of said plate includes a refrigerated chamber, and in which said plate forms one wall of said chamber.

3. Apparatus as defined in claim 2, in which a plano-convex lens forms the opposite wall of the chamber and is positioned in front of the photoelectric cell.

4. In apparatus for inspecting the dew point of multiple sheet glazing units, comprising an annular plate in contact with a part of a major surface of one of the sheets of the glazing unit, said annular plate being provided with an aperture, light transmitting rod means received in said aperture, means for reducing the temperature of said plate to below ambient room temperature, means for measuring light intensity aligned with the end of said rod remote from said glazing unit, and means for directing light rays through said glazing unit and rod means to said light measuring means.

5. Apparatus as defined in claim 4, wherein said rod means is made of quartz.

6. Apparatus as defined in claim 4, wherein said means for reducing the temperature of said plate includes a tank filled with a refrigerant.

References Cited in the file of this patent

UNITED STATES PATENTS

| | | |
|---|---|---|
| 1,883,116 | Tomlinson | Oct. 18, 1932 |
| 1,960,658 | Brace | May 29, 1934 |
| 2,455,966 | Ackley | Dec. 14, 1948 |
| 2,466,696 | Friswold et al. | Apr. 12, 1949 |
| 2,468,691 | Smith | Apr. 26, 1949 |
| 2,829,363 | Obermaier et al. | Apr. 1, 1958 |